R. E. MELOEN.
CULTIVATOR.
APPLICATION FILED SEPT. 18, 1908.
975,975.
Patented Nov. 15, 1910.
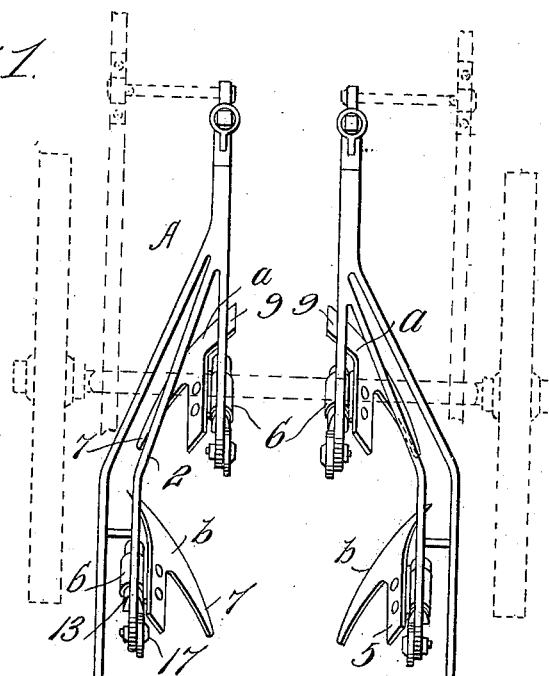
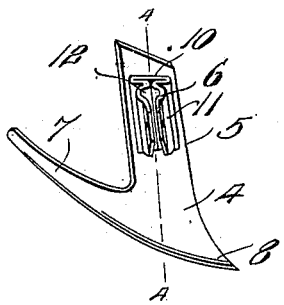

UNITED STATES PATENT OFFICE.

RAMOND E. MELOEN, OF KEWANEE, ILLINOIS.

CULTIVATOR.

975,975.

Specification of Letters Patent.   Patented Nov. 15, 1910.

Application filed September 18, 1908.   Serial No. 453,609.

*To all whom it may concern:*

Be it known that I, RAMOND E. MELOEN, a citizen of the United States, residing at Kewanee, in the county of Henry and State of Illinois, have invented new and useful Improvements in Cultivators, of which the following is a specification.

This invention relates to cultivators and more particularly to shovels therefor which are designed to effectively work the soil without throwing too much soil on the plants.

The invention has for one of its objects to improve and simplify the construction of cultivator shovels so as to be comparatively simple and inexpensive to manufacture, reliable and efficient in use, and readily applied to cultivators already in use that are provided with round plow-carrying shanks.

Another object of the invention is the provision of a cultivator shovel constructed of a single piece of metal and provided with a laterally and rearwardly extending wing which passes under the surface of the soil without throwing the soil to one side to any great extent, and projecting upwardly from the body of the shovel is a stem or tongue which is equipped at its rear side with a clamp for adjustably attaching the shovel to the supporting shank of the cultivator.

With these objects in view and others, as will appear as the description proceeds, the invention comprises the various novel features of construction and arrangement of parts which will be more fully described hereinafter and set forth with particularity in the claim appended hereto.

In the accompanying drawing, which illustrates one embodiment of the invention, Figure 1 is a plan view of a cultivator of the gang type showing a plurality of the improved shovels applied thereto. Fig. 2 is a rear perspective view of one of the front shovels. Fig. 3 is a rear perspective view of one of the rear shovels. Fig. 4 is a sectional view on line 4—4, Fig. 3.

Similar reference characters are employed to designate corresponding parts throughout the views.

In the present instance, I have elected to illustrate the invention as applied to a gang cultivator of the sulky type, but it is to be understood that it may be used in any other desired form of cultivator.

Referring to the drawing, A designates the frame of the cultivator shown in dotted lines, and attached to the frame are shovel-carrying beams 1, 2 and 3, for each gang of the cultivator, the beams being of successively increasing length and suitably connected together at their front ends, while on their rear ends are carried shovels *a*, *b* and *c*. The front shovels *a*, which run along opposite sides of the row of plants, are reversely arranged with respect to the shovels *b* and *c* and operate to loosen the soil at opposite sides of the row and cut and dislodge the grass and weeds, and the other shovels *b* and *c* tend to work the soil toward the plants without unduly covering the same. The shovels *b* are set closer to the row than the shovels *c*, the middle shovels *b* working immediately behind the front shovels *a*, while the shovels *c* loosen the soil near to the center of the rows. The shovels, which may be stamped of sheet metal, forged or otherwise constructed, each consist of a body portion 4 from which rises a stem or tongue 5 to the rear side of which is fastened a clamp designated generally by 6 for securing the shovels to a beam. The front side of the body is slightly convex, and extending laterally and rearwardly therefrom is a wing 7 which tapers toward its rear extremity and is of such thickness as to easily penetrate the soil without throwing the soil at one side. The forward lower corners of the bodies of the shovels *b* and *c* are extended into sharp points 8. The front shovels *a*, instead of terminating at the front in a sharp point, are provided with forwardly-projecting wings 9 which coöperate with the rearwardly-extending wings 7 to present a large working surface so as to loosen a wide strip of soil at opposite sides of the plants and the wings 9 are of such height as to pass under the surface of the soil. The clamping device 6, as shown in Figs. 2 and 3, is constructed of a piece of sheet metal bent into a flat plate 10 and spring jaws 11 extending rearwardly from the plate and oppositely curved to form a socket 12 for receiving a rounded shank 13, as shown in Fig. 2. The resilient jaws 11 are provided with parallel apertured lugs 14 through the apertures of which extend the tightening bolt 15 for clamping the jaws around the shank 13 of the beam. The shank is of the same diameter throughout its length so that the shovel can be raised and lowered thereon, and furthermore, the shovel can be turned around the shank at any angle. The shank is pivoted to the beam at 16 and can be adjusted on the pivot to vary the inclination of the shank and held in adjusted position by a clamping bolt 17 on the beam which passes through an arcuate slot 18 in the upper end of the shank, as shown in Fig. 2. As shown in Fig. 4, the plate 10 of the clamping device 6 is fastened to the shovel by rivets 19. If desired, the shovels of one gang can be interchanged with those of the other gang for cultivating between the rows.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention, what I claim is:—

A cultivator shovel comprising a body portion having an upwardly extending tongue, said body portion being provided with a downwardly and forwardly inclined front edge and having a downward and forward concavo-convex curvature of greatest degree at its forward edge and gradually decreasing in extent toward its rear edge, the lower edge of the body being arranged to form with the front edge thereof an upturned point and thence extending upwardly and rearwardly on a curved line toward said rear edge, thus gradually decreasing the depth of the body rearwardly, and a wing extending upwardly and rearwardly from the rear edge of the body and gradually tapering throughout its length toward its free end, said free end of the wing having a backward inclination at a greater angle than the body of the wing.

In testimony whereof I affix my signature in presence of two witnesses.

RAMOND E. MELOEN.

Witnesses:
LUCY WELLS,
BLANCHE HILL.